(12) United States Patent
Kovac

(10) Patent No.: US 12,174,971 B1
(45) Date of Patent: Dec. 24, 2024

(54) SYSTEM AND METHOD FOR SECURE ELECTRONIC TRANSMISSION

(71) Applicant: QRCrypto SA, Fribourg (CH)

(72) Inventor: Stiepan A. Kovac, Fribourg (CH)

(73) Assignee: QRCrypto SA, Fribourg (CH)

( * ) Notice: Subject to any disclaimer, the term of this patent is extended or adjusted under 35 U.S.C. 154(b) by 222 days.

(21) Appl. No.: 16/855,958

(22) Filed: Apr. 22, 2020

Related U.S. Application Data

(60) Provisional application No. 63/005,209, filed on Apr. 3, 2020, provisional application No. 62/942,033, filed on Nov. 29, 2019, provisional application No. 63/007,922, filed on Apr. 9, 2020.

(51) Int. Cl.
| | | |
|---|---|---|
| *G06F 21/00* | (2013.01) | |
| *G06F 21/60* | (2013.01) | |
| *G06F 21/72* | (2013.01) | |
| *H04L 9/06* | (2006.01) | |
| *H04L 9/14* | (2006.01) | |

(52) U.S. Cl.
CPC ............ *G06F 21/602* (2013.01); *G06F 21/72* (2013.01); *H04L 9/0631* (2013.01); *H04L 9/14* (2013.01)

(58) Field of Classification Search
CPC ..... G06F 21/602; G06F 21/72; H04L 9/0631; H04L 9/14
See application file for complete search history.

(56) References Cited

U.S. PATENT DOCUMENTS

| | | | |
|---|---|---|---|
| 2004/0260921 A1* | 12/2004 | Treadwell | H04L 63/0442 713/150 |
| 2017/0063530 A1* | 3/2017 | Fiske | H04L 9/0618 |
| 2017/0201492 A1* | 7/2017 | Kim | H04L 63/045 |
| 2019/0268155 A1* | 8/2019 | Guo | G06F 21/33 |

OTHER PUBLICATIONS

Kelsey, J. , et al., "SHA-3 Derived Functions: cSHAKE, KMAC, TupleHash and ParallelHash", Special Publication (NIST SP), National Institute of Standards and Technology, 2016, Gaithersburg, MD: pp. 1-32. https://doi.org/10.6028/NIST.SP.800-185.
Underhill, J.G., et al., "Towards post-quantum symmetric cryptography", Cryptology ePrint Archive, Paper 2019/553, 2019: pp. 1-10. https://eprint.iacr.org/2019/553.
Liskov, M., et al., "Tweakable Block Ciphers", Journal of Cryptology, 2011, vol. 24: pp. 588-613. DOI: 10.1007/s00145-010-9073-y.
Barker, E., "Recommendation for Key Management: Part 1—General", Special Publication (NIST SP), National Institute of Standards and Technology, 2020, Gaithersburg, MD: pp. 1-160. https://dx.doi.org/10.6028/NIST.SP.800-57pt1r4.

(Continued)

*Primary Examiner* — Andrew J Steinle
(74) *Attorney, Agent, or Firm* — Goodwin Procter LLP

(57) ABSTRACT

A system, method, and computer-readable medium having instructions thereon for a method is provided for cryptographically securing electronic transmissions, whether for standalone use on text or embedded in processor hardware. The making of and using enhanced 256-bit symmetric ciphers which are FIPS-compliant is provided for security of transmissions as well as of static information, i.e., data at rest.

18 Claims, 14 Drawing Sheets

(56) References Cited

OTHER PUBLICATIONS

Mandal, K., et al., "A Comprehensive Security Analysis of the TUAK Algorithm Set", IEEE Transactions on Information Forensics and Security, 2015: pp. 1-20. https://api.semanticscholar.org/CorpusID:39916781.

Kiran, S., et al., "PKI Basics—A Technical Perspective", PKI Forum's Business Working Group (BWG), 2002, pp. 1-12. https://api.semanticscholar.org/CorpusID:63364488.

Sasaki, M., "Quantum Key Distribution (QKD); Component characterization: characterizing optical components for QKD systems", IEEE Security & Privacy <https://ieeexplore.ieee.org/xpl/RecentIssue.jsp?punumber=8013>, Sep./Oct. 2018, vol. 16, Issue 5: pp. 1-136. DOI: 10.1109/MSP.2018.3761713 <https://doi.org/10.1109/MSP.2018.3761713>.

"Universal Mobile Telecommunications System (UMTS); LTE; Specification of the TUAK algorithm set: A second example algorithm set for the 3GPP authentication and key generation functions f1, f1*, f2, f3, f4, f5 and f5*; Document 1: Algorithm specification (3GPP TS 35.231 version 12.1.0 Release 12", ETSI TS 135 231 V12.1.0 (Oct. 2014), 2014: pp. 1-29.

National Institute of Standards and Technology, "Announcing the Advanced Encryption standard (AES)", Federal Information Processing Standards Publication 197, Nov. 2001: pp. 1-51.

Liskov, M., et al., "Tweakable Block Ciphers", Advances in Cryptology—CRYPTO 2002, 2002, Lecture Notes in Computer Science, vol. 2442, Springer, Berlin, Heidelberg: pp. 31-46. https://doi.org/10.1007/3-540-45708-9_3.

\* cited by examiner

| AES-256 | |
|---|---|
| Key Length (Nk words) | 8 |
| Block Size (Nb words) | 4 |
| Number of Rounds (Nr) | 14 |

FIG. 8

| y\x | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | 63 | 7c | 77 | 7b | f2 | 6b | 6f | c5 | 30 | 01 | 67 | 2b | fe | d7 | ab | 76 |
| 1 | ca | 82 | c9 | 7d | fa | 59 | 47 | f0 | ad | d4 | a2 | af | 9c | a4 | 72 | c0 |
| 2 | b7 | fd | 93 | 26 | 36 | 3f | f7 | cc | 34 | a5 | e5 | f1 | 71 | d8 | 31 | 15 |
| 3 | 04 | c7 | 23 | c3 | 18 | 96 | 05 | 9a | 07 | 12 | 80 | e2 | eb | 27 | b2 | 75 |
| 4 | 09 | 83 | 2c | 1a | 1b | 6e | 5a | a0 | 52 | 3b | d6 | b3 | 29 | e3 | 2f | 84 |
| 5 | 53 | d1 | 00 | ed | 20 | fc | b1 | 5b | 6a | cb | be | 39 | 4a | 4c | 58 | cf |
| 6 | d0 | ef | aa | fb | 43 | 4d | 33 | 85 | 45 | f9 | 02 | 7f | 50 | 3c | 9f | a8 |
| 7 | 51 | a3 | 40 | 8f | 92 | 9d | 38 | f5 | bc | b6 | da | 21 | 10 | ff | f3 | d2 |
| 8 | cd | 0c | 13 | ec | 5f | 97 | 44 | 17 | c4 | a7 | 7e | 3d | 64 | 5d | 19 | 73 |
| 9 | 60 | 81 | 4f | dc | 22 | 2a | 90 | 88 | 46 | ee | b8 | 14 | de | 5e | 0b | db |
| a | e0 | 32 | 3a | 0a | 49 | 06 | 24 | 5c | c2 | d3 | ac | 62 | 91 | 95 | e4 | 79 |
| b | e7 | c8 | 37 | 6d | 8d | d5 | 4e | a9 | 6c | 56 | f4 | ea | 65 | 7a | ae | 08 |
| c | ba | 78 | 25 | 2e | 1c | a6 | b4 | c6 | e8 | dd | 74 | 1f | 4b | bd | 8b | 8a |
| d | 70 | 3e | b5 | 66 | 48 | 03 | f6 | 0e | 61 | 35 | 57 | b9 | 86 | c1 | 1d | 9e |
| e | e1 | f8 | 98 | 11 | 69 | d9 | 8e | 94 | 9b | 1e | 87 | e9 | ce | 55 | 28 | df |
| f | 8c | a1 | 89 | 0d | bf | e6 | 42 | 68 | 41 | 99 | 2d | 0f | b0 | 54 | bb | 16 |

FIG. 10

SYSTEM AND METHOD FOR SECURE ELECTRONIC TRANSMISSION

CROSS-REFERENCE TO RELATED APPLICATION(S)

This application claims priority to U.S. Provisional Patent Application No. 62/942,033, entitled "System and Method for Secure Electronic Transmission," filed on Nov. 29, 2019, and to U.S. Provisional Patent Application No. 63/005,209, entitled "System and Method for Secure Electronic Transmission," filed on Apr. 3, 2020, and to U.S. Provisional Patent Application No. 63/007,922, entitled "System and Method for Secure Electronic Transmission," filed on Apr. 9, 2020, and incorporates each of those patent applications in its entirety by reference hereto.

COPYRIGHT AND TRADEMARK NOTICE

Portions of the disclosure in this patent application contain material which is subject to copyright and/or trademark protection. The patent application owner has no object to the facsimile reproduction of the published patent application or any resulting granted patent, as it appears in the U.S. Patent and Trademark Office records, but otherwise reserves all copyright and trademark rights whatsoever throughout the world.

FIELD OF INVENTION

The present invention provides for a system, method, and computer-readable medium having instructions thereon for performing a method for secure electronic transmission; more specifically, the present invention provides for an enhanced cryptographic algorithm which is FIPS compliant.

BACKGROUND INFORMATION

Every day brings more news of company systems being hacked. It has been published that on average, more than 1 million usernames and passwords are unintentionally released or misappropriated every day. Possible solutions to protection of sensible data ranging from passwords to DNA (deoxyribonucleic acid) samples is to encrypt that data using strong symmetric cryptography, such that even if malevolent actors get into the system or otherwise get their hands on the data, they would have no use of it, even if they were to possess a large enough quantum computer to break existing asymmetric cryptography such as RSA (Rivest-Shamir-Adleman), ECC (Elliptic-Curve Cryptography) and symmetric cryptography with an effective strength of less than 256 bits.

Presently, FIPS (Federal Information Processing Standard) compliance is required for US government computers. The Advanced Encryption Standard (AES) is an encryption model used by the US government, which is considered FIPS compliant. The AES standard includes 128-bit, 192-bit, and 256-bit encryption keys. The difference between the keys is that the longer the key size (e.g., the 256-bit key is longest of the three), the harder it is supposed to be to crack the ciphertext using brute force; likewise, the number of rounds used increases. For example, AES-128 uses ten rounds, AES-192 uses twelve rounds, and AES-256 uses fourteen rounds. For example, while AES-128 should be sufficient for securing short-lived systems, AES-256 currently would be the standard FIPS encryption used to protect against quantum brute force attacks. In using Grover's algorithm, a brute force attack on any k-bit key block cipher would only take $O(2k/2)$ steps. Recent developments have shown that the efficiency of running Grover's attack on AES-256, notably, would be even higher thanks to unexpected quantum compiler optimizations (see, e.g., IACR eprint 2019/1146 "Implementing Grover Oracles for Quantum Key Search on AES and LowMC", incorporated herein in its entirety by reference thereto), catering for the need of even stronger symmetric cryptography to stand the test of time and technological revolutions.

In order to be FIPS compliant, the National Institute of Standards and Technology (NIST) uses the Cryptographic Module Validation Program (CMVP) to determine whether a specific algorithm is compliant with the FIPS 140 standard which defines approved cryptographic algorithms. Federal agencies and departments having classified information can use AES-256, described above, to provide the desired security for such information. Likewise, non-government commercial and private organizations can use AES-256. However, as described above, and seen almost daily in the news, the attack on software systems is increasing and becoming increasingly sophisticated and powerful. Accordingly, there is an increasing need for a more enhanced cryptographic system and method which is still FIPS-compliant.

SUMMARY

Embodiments of the present invention provide for a highly secure encryption system and method which can be accessed directly via a processing device. Embodiments of the present invention provide for a highly secure encryption system and method which is accessed via a communications system, e.g., Cloud-based, WLAN, LAN, et al., by a processing system. Embodiments of the present invention provide that the encryption system and method can occur remotely in a separate processor from the requesting entity. Embodiments of the present invention provide that the encryption system and method can be downloaded or otherwise obtained by the requesting entity's processor and/or the encryption occurs local to the entity's processor. Embodiments of the present invention provide for a highly secure encryption system and method which is disposed in a processing device so that the memory contents and/or access to the processor memory is protected. Embodiments of the present invention provide for an improved cryptographically secure method and system for communications systems worldwide, including e-commerce and communications applications, VPN technology systems, hard drive and disk drive encryptions, and secure databases.

Embodiments of the present invention provide for a computer software method comprising: retrieving, via a computer, a first type of encryption algorithm; executing, via the computer, the first type of encryption algorithm on an identified data; generating, via the computer, a first encrypted data output; retrieving, via the computer, a second type of encryption algorithm; executing the second type of encryption algorithm on the first encrypted data output; and generating an enhanced encrypted data output. In an embodiment, the computer software method further includes storing the first encrypted data output in a secure memory location. In an embodiment, the computer software method includes a first type of encryption algorithm including/ involving at least one of: enhanced-AES; Tuak; PKI; tweakable block cipher, and QKD. In an embodiment, the computer software method includes a second type of encryption algorithm which is the AES algorithm. In an embodiment, the computer software method provides a first type of encryption algorithm as enhanced-AES and the second type of encryption algorithm as AES.

Embodiments of the present invention provide for a computer system comprising: at least one hardware module; a system memory; a system memory controller to control communication between the at least one software module and the system memory; wherein the system memory stored computer-executable instructions for a secure transmission method, including: retrieving, via a computer, a first type of encryption algorithm; executing, via the computer, the first type of encryption algorithm on an identified data; generating, via the computer, a first encrypted data output; retrieving, via the computer, a second type of encryption algorithm; executing the second type of encryption algorithm on the first encrypted data output; and generating an enhanced encrypted data output. In an embodiment, the secure transmission method further includes storing the first encrypted data output in a secure memory location. In an embodiment, the first type of encryption algorithm involves at least one of: enhanced-AES; Tuak; tweakable block cipher, PKI, and QKD. In an embodiment, the second type of encryption algorithm is an AES algorithm. In an embodiment, the first type of encryption algorithm is an enhanced-AES algorithm and the second type of encryption algorithm is an AES algorithm or other entity-compliant algorithm. In an embodiment, the system memory controller effects the execution of the secure transmission method for the at least one hardware module.

Embodiments of the present invention provide for a non-transitory computer-readable medium, having instructions thereon for performing a method comprising: retrieving, by a processor, a first type of encryption algorithm; executing, by the processor, the first type of encryption algorithm on an identified data; generating, by the processor, a first encrypted data output; retrieving, by the processor, a second type of encryption algorithm; executing, by the processor, the second type of encryption algorithm on the first encrypted data output; and generating, by the processor, an enhanced encrypted data output. In an embodiment, the method further includes storing the first encrypted data output in a secure memory location. In an embodiment, the first type of encryption algorithm involves at least one of: enhanced-AES; Tuak; PKI; tweakable block cipher; and QKD. In an embodiment, the second type of encryption algorithm is AES algorithm or other entity-compliant algorithm. In an embodiment, the first type of encryption algorithm is enhanced-AES and the second type of encryption algorithm is AES.

BRIEF DESCRIPTION OF THE DRAWINGS

FIG. 8 shows a table of various AES key block rounds combinations.

FIG. 10 shows an example S-Box used in the SubBytes( ) transformation according to an embodiment of the present invention.

DETAILED DESCRIPTION

Figure 1:
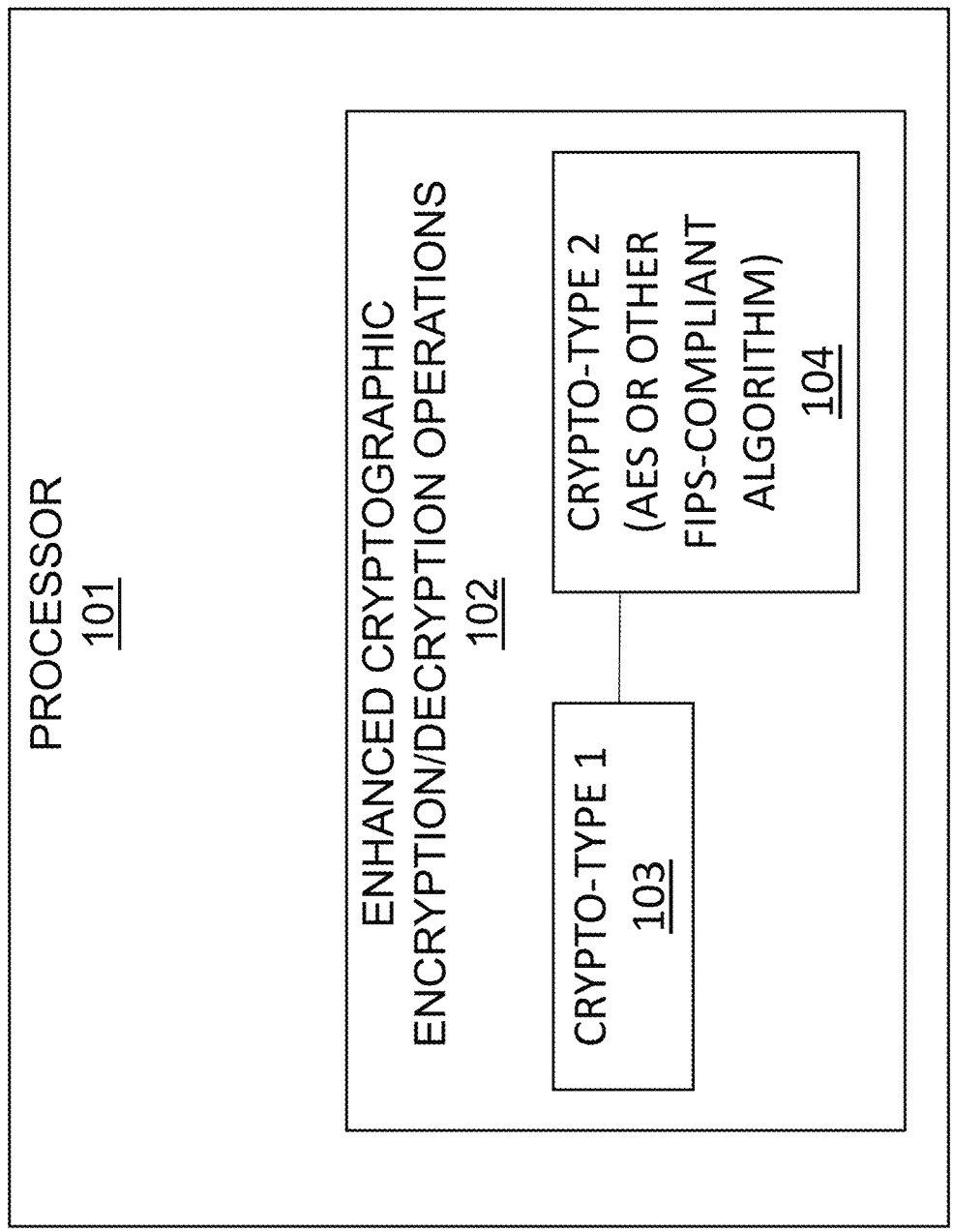
FIG. 1 shows an example processor system according to an embodiment of the present invention.

Embodiments of the present invention provide for a system, method, apparatus, and computer-readable medium having instructions thereon for executing a method for secure electronic transmission. Embodiments of the present invention provide a system and method for making enhanced 256-bit symmetric ciphers. The embodiments described in this application are for explanatory purposes and apply to all of the system, method, apparatus, and computer-readable medium having instructions thereon for executing a method ways for securing electronic transmissions for the present invention.

Embodiments of the present invention provide a system and method for making enhanced 256-bit symmetric ciphers, that is, ciphers that bring some security advantage over AES-256, at the same key size, FIPS-compliant, by combining these with AES-256 in an innovative way that provides FIPS-compliance.

In embodiments of the present invention, the examples use 256-bit keys. In embodiments of the present invention, other sized bit keys can be used, depending upon how robust and secure of a system desired. Using 128-bit block, FIPS-compliant AES as the core encryption loop for the enhanced algorithm, the key size has a maximum limit of 1024 bits.

In embodiments of the present invention, the examples call for two different types of encryption methods. In embodiments of the present invention, the same types of encryption methods can be used. However, for an attacker, once the attacker gets through a first type of encryption, it can be less difficult for the attacker to also get through a second encryption having the first type since the attack method used likely will not have to be altered. Instead, with two different types of encryption algorithms, that should make it more onerous for an attacker to break. In embodiments of the present invention, the system and method are not limited to just two types of encryption algorithms. Multiple encryption algorithms can be used in succession or in different combinations, depending upon the security required by the user or the type of information or data. Such increases the time for encrypting and decrypting the information. Accordingly, depending upon the information such as credit card information, a user can determine that a two-type encryption is sufficient.

Embodiments of the present invention provide for an efficient and usable encryption system and method by employing an enhanced-AES (or other method) and then an AES-256 encryption.

In an embodiment of the present invention, a system and/or method integrate an enhanced symmetric encryption at the hardware level, and uses normal AES on top of it in userland software. This is FIPS compliant and yet a more secure and protected system memory than currently provided system of AES encryption. Embodiments of the present invention can have the cryptosystem located at the hardware level or another "low" level, with system privileges to encrypt all or a part of everything in memory.

Embodiments of the present invention provide for any system using some form of enhanced, quantum-resistant symmetric encryption at system/ring 0/hardware level to encrypt everything in memory, and subsequently using FIPS AES or some other FIPS-compliant encryption upon the encrypted in-memory data to achieve FIPS compliance.

Embodiments of the present invention provide a form of layered encryption that uses the AES SIV CMAC wrap construct specifically in order to use both an enhanced 256-bit symmetric cipher and AES-256, in the order those have been mentioned, so as to produce FIPS-compliant output, while enhancing security.

Embodiments of the present invention provide for improved resistance against quantum force brute attacks, by providing an enhanced cryptosystem. In order to get through, an attacker would have to break both the AES-256 system and the enhanced cipher system. This allows for a more streamlined and efficient means of protecting an electrically accessed system such as a database, server, terminal, processor, et al. This is a direct advantage over the current AES-only system, which has been enhanced by adding more hardware structure to add difficulties or additional layers for bots/attackers. Such additional hardware costs more in equipment and time to obtain and setup. Accordingly, embodiments of the present invention provide for a lower overhead and maintenance cost with its enhancement.

Embodiments of the present invention provide for improved resistance against related key attacks. In cloud computing, there are many related keys used, and so use of the present invention can add additional security. With the advent of quantum computing with artificial intelligence (AI), this additional security can be considered useful for less-critical, everyday systems as well, owing to the potential of AI-optimized exploitation of quantum IT resources as described, for example, in the ICAR e-print 2019/1146 article, by Microsoft research et al., incorporated herein in its entirety by reference thereto. The ICAR article showed a 25% improvement in efficiency of Grover's algorithm against AES-256 when compiled using Q #, which can be considered a basic form of AI, as it led to better than expected results by its developers, without human interference.

Embodiments of the present invention provide for hybrid symmetric encryption in PKI. This can allow for needed compliance and increased security in the post-quantum context, as described herein.

Embodiments of the present invention can include its use into PKI systems where more than one symmetric cipher is supported. There, embodiments of the present invention can serve as an extension to such PKI systems to make FIPS-compliant quantum-resistant symmetric cryptography systems more robust. For example, a system can exchange two (different) 256-bit PKI keys, and use, for example, a first key with eAES and the second with AES, to encrypt the data to be protected, as described in various embodiments herein. In an embodiment, a system can also use a "hybrid" asymmetric key exchange in a novel way which can strengthen the whole system. For example, with this extension, a system can effect a key exchange for the key meant to be used in the first pass (enhanced symmetric encryption such as eAES) with a quantum-safe mechanism such as PQC ("Post-Quantum Cryptography") or QKD ("Quantum Key Distribution"). Then, the system can effect a second key exchange for the key meant for the FIPS-compliant pass (such as AES) using FIPS-compliant key exchange mechanisms. In an embodiment, such FIPS-compliant key exchange mechanisms can include PQC mechanisms.

For example, in an embodiment, QKD relies on quantum mechanics, unlike a traditional random key generation that relies on computation difficulty. QKD is a secure communication method which allows for two parties to produce a shared random secret key which can be used to encrypt and decrypt messages. Special to QKD is that the two parties are able to detect the presence of a third party trying to gain knowledge of the key, or eavesdrop, by observing the detectable anomalies left by the third party attempting to measure the key. If the level of eavesdropping is below a predetermined threshold, secure communication can continue. In an embodiment, the QKD is used for production and distribution of a key, not for the transmission of the messages. The encryption algorithm embodiments of the present invention are then employed using the key by QKD.

FIG. 1 shows an example processor 101 according to an embodiment of the present invention. In FIG. 1, the enhanced cryptographic encryption and decryption operations 102 are associated directly with the processor 101 to protect internal data or information of the processor system. The enhanced cryptographic operations 102 include a two-part system according to an embodiment of the present invention. The two-part system involves using a first cryptographic algorithm 103 on specific data to generate an intermediate output and then using a second cryptographic algorithm 104 on the intermediate output. Embodiments of the present invention can be used on available software processing systems, whether standalone or networked. Embodiments of the present invention can be used internally in processor memory systems, e.g., such as that for a general purpose processor, Intel® processors, special purpose processor, and others. Embodiments of the present invention are specifically advantageous in use internally in a processor's architecture, e.g., a RISC-V based architecture, in order to more efficiently and securely combat side-channel attacks. In an embodiment, the cryptographic two-type algorithm system can be directly employed in a processor's architecture, and distributed with the processor.

Figure 2:
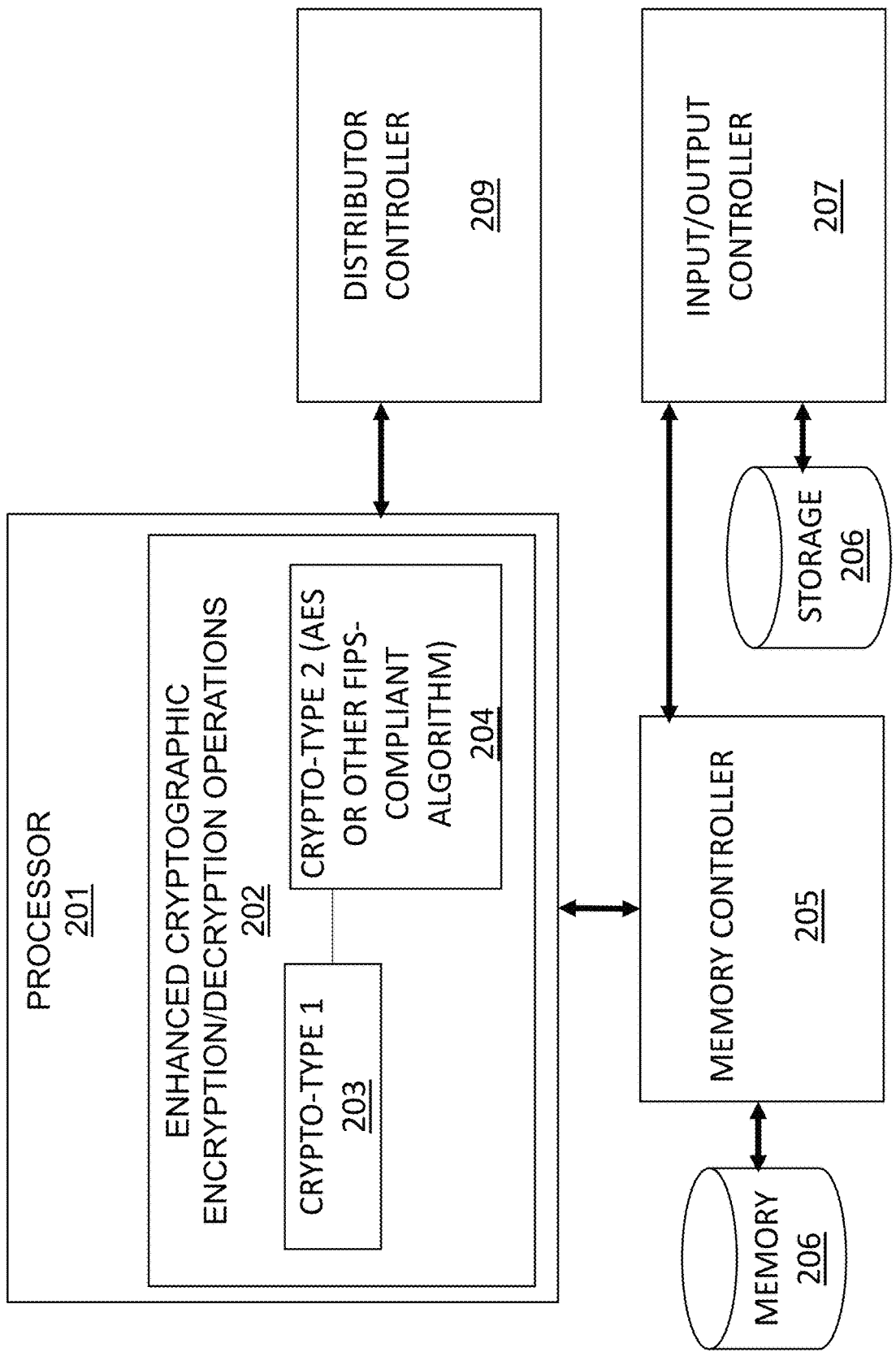
FIG. 2 shows an example computer system according to an embodiment of the present invention.

FIG. 2 shows an example computer system according to an embodiment of the present invention. In FIG. 2, a processor 201 for a processing system, e.g., a computer system, is shown. The processor 201 includes an embodiment of the enhanced cryptographic encryption and/or decryption operations 202 having a two-cryptographic algorithm type system. Memory access 205 and/or data stored in the memory 206 and/or the storage device 208, is first encrypted by a first cryptographic algorithm type 203 and then the resulting output is next encrypted by the second cryptographic algorithm type 204. The memory 206 can be, e.g., a DRAM (Dynamic Random Access Memory), SDRAM (Synchronized Dynamic Random Access Memory), RDRAM (Rambus Dynamic Random Access Memory), SRAM (Static Random Access Memory), or any available memory type. The memory controller 205 controls communications between the processor 201 and the memory 206. The input/output (I/O) controller 207 controls, among other things, the communication of data between the processor 201 and the motherboard, for example. Effectively, the I/O controller 207 helps in the connection and control of peripheral input and/or output devices. In FIG. 2, the I/O controller 207 communicates directly with the memory access 295, i.e., memory controller, so that blocks of data can be transferred to and from the memory 206 without going through the processor 201 which would create an inefficiency. The I/O controller 207 is associated with one or more storage devices 208 which can be used as buffer storage, among other things. The I/O controller 207 can be a series of microchips. The storage device 208 can be, e.g., a disk drive, a CD (Compact Disk) drive, a DVD (Digital Video Disk) drive, a tape drive, a RAID (Redundant Array of Independent Disks), and/or a network of storage devices.

Figure 3:
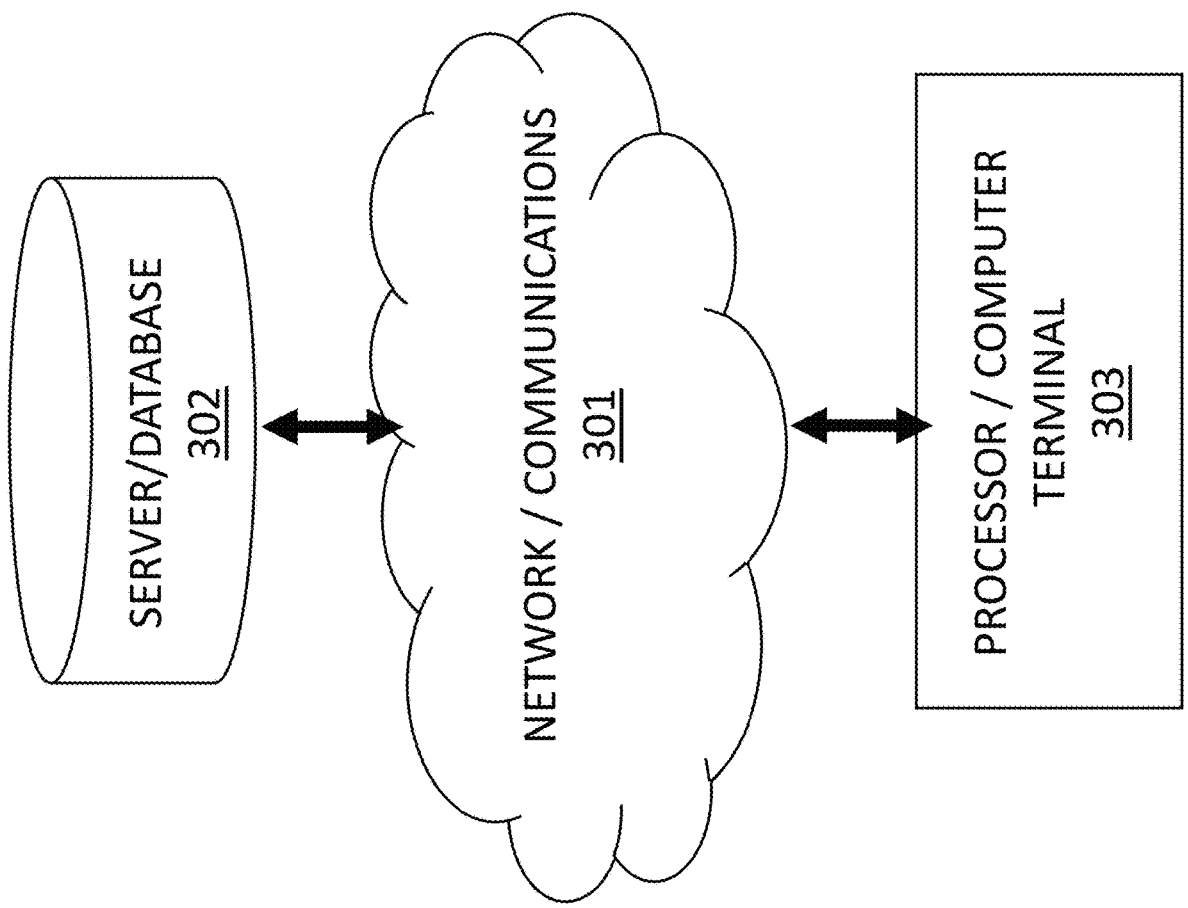
FIG. 3 shows an example system according to an embodiment of the present invention.

FIG. 3 shows an example system according to an embodiment of the present invention. In FIG. 3, a processor or computer terminal 303 communicates via a network or communications system 301 with a server 302. The server 302 stores the cryptographic method and system according to embodiments of the present invention. The processor 303 can request and obtain the cryptographic method and system downloaded on its device or an associate storage device. Alternatively, the processor 303 can upload data for encryption through the network 301 to the server 302 having a storage or database. The server 302 can include a processing device for initiating the two-type encryption on the uploaded data. Alternatively, the processor 303 serves as the processing device controlling the server 302 via a network or communications system 301.

Figure 4:
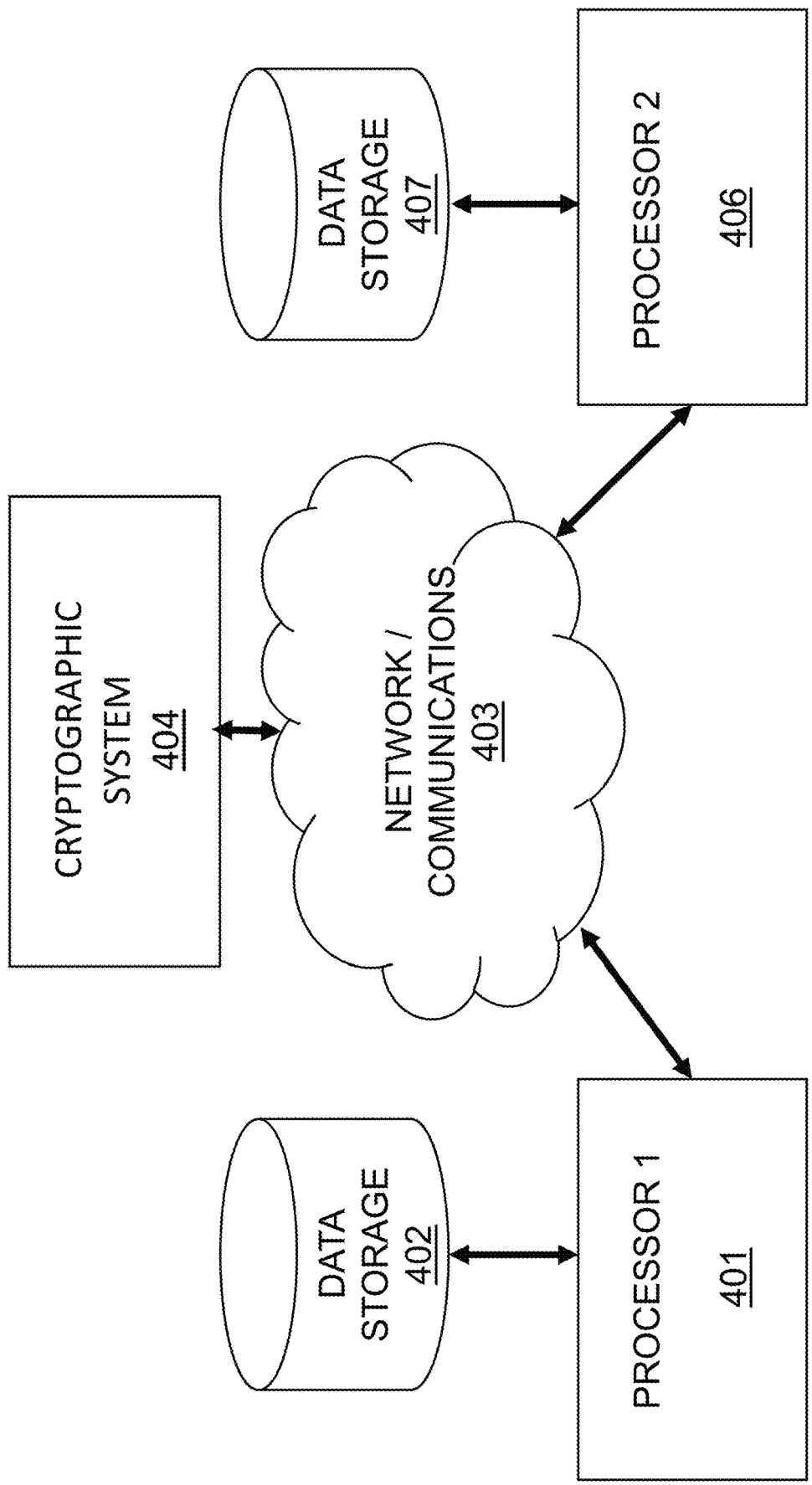
FIG. 4 shows an example system with two or more communicating entities according to an embodiment of the present invention.

FIG. 4 shows an example system with two or more communicating entities according to an embodiment of the present invention. In FIG. 4, a first processor 401, associated with a data storage device 402, communicates via a communications system 403 to the cryptographic system 404 according to embodiments of the present invention. The cryptographic system 404 transmits an executable file or series of information to the first processor 401. The first processor 401 can then use the data or matter in the data storage 402 and encrypt it for transmitting to a second or more processors 406 having an associated data storage 407.

Figure 5:
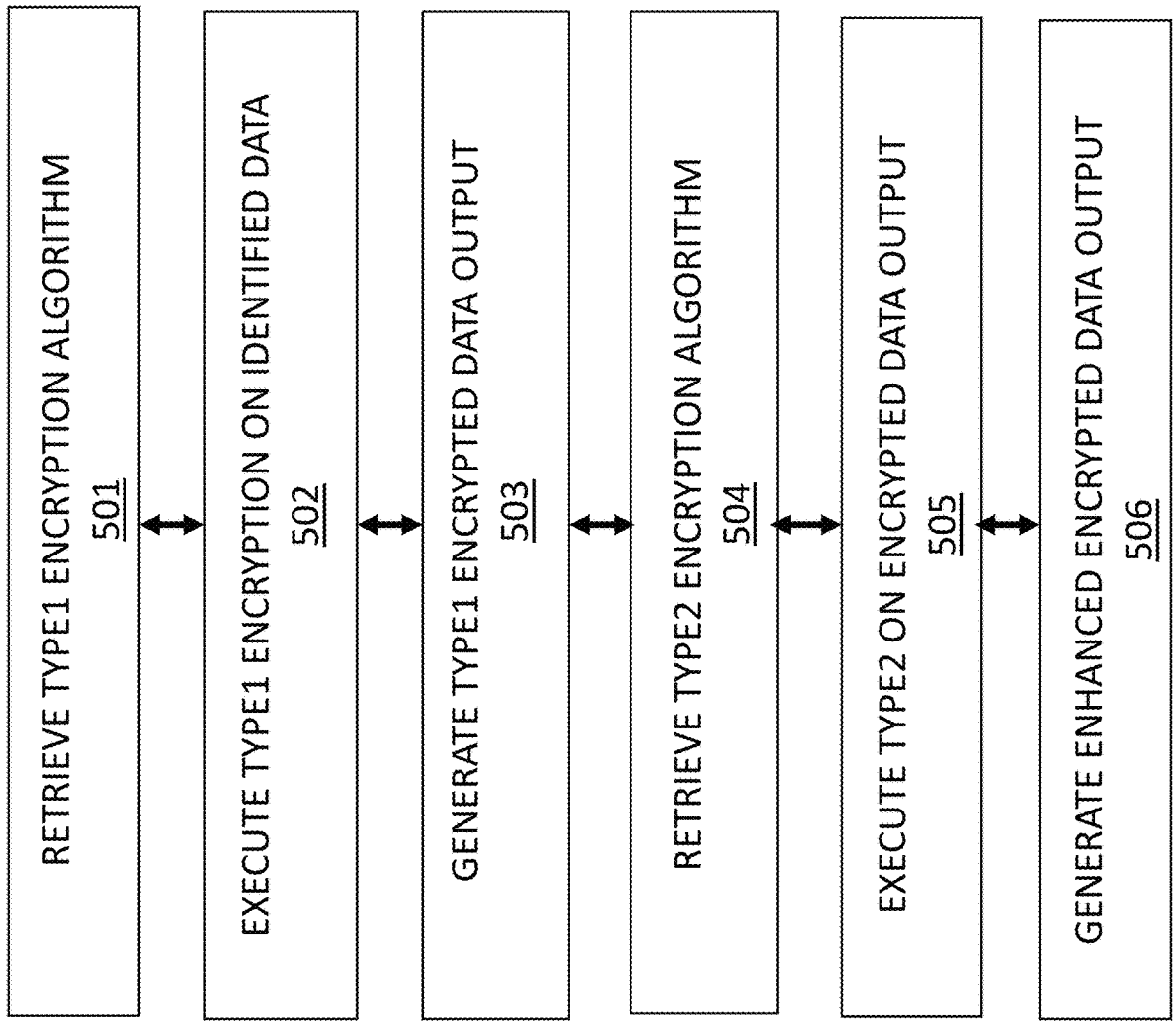
FIG. 5 shows an example method using two different cryptographic algorithms according to an embodiment of the present invention.

FIG. 5 shows an example method using two different cryptographic algorithms according to an embodiment of the present invention. A variety of cryptographic algorithms can be used for the type-1 encryption algorithm. In embodiments of the present invention, it was found that using 256-bit key provided a more efficient and compatible output to serve as an input for the type-2 encryption algorithm if using, e.g., AES-256, or other FIPS compliant algorithm. In FIG. 5, a first type of encryption algorithm is retrieved 501 and then executed 502 on a specific data or information. An encrypted data is generated 503, and then a second type of encryption algorithm is retrieved and then executed 505 on the previously generated encrypted data. A resulting enhanced encrypted and FIPS compliant data output is generated 506. For the first type, the key schedule for the encryption algorithm can be another algorithm, such as Tuak. Tuak is a mutual authentication and key generating algorithm by SAGE™ (Security Algorithm Group of Experts) and ETSI™ (European Telecommunications Standards Institute), and published by 3GPP™ (Third Generation Partnership Project). See, for example, ETSI TS 135 231, V12.1.0 (2014 October), which is incorporated herein it its entirety by reference thereto. In addition, tweaked 256-bit block ciphers, such as, but not limited to, Threefish, can be used for the first type likewise stream ciphers such as ChaCha20, with the following limitation in their case. For example, as explained in IETF (Internet Engineering Task Force) RFC (Request for Comment) 8439, by Y. Nir and A. Langley, IETF Trust (June, 2018), incorporated herein in its entirety by reference thereto, "[t]his limits the use of single (key, nonce) combination to 2^32 blocks, or 256 GB, but that is enough for most uses. In cases where a single key is used by multiple senders, it is important to make sure that they don't use the same nonces. This can be assured by partitioning the nonce space so that the first 32 bits are unique per sender, while the other 64 bits come from a counter."

In the case of using embodiments of the present invention within a PKI system, it would use the possibility in X.509 and X.510, and similar, to specify more than one supported algorithm and as long as both parties can agree on both a FIPS-Compliant and an enhanced algorithm, use both as specified in embodiments of the present invention.

In an embodiment, the AES algorithm can have a cipher key, K, length of various bits, e.g., here, 256 bits. The key length is represented by Nk=8, reflecting the number of 32-bit words in the cipher key K. For example, for the AES algorithm, the number of rounds is dependent upon the key size, such that when the key size Nk is 8, the number of rounds Nr is 14. In FIG. 8 illustrates the AES-256 key block rounds combination.

The AES algorithm for both the cipher and inverse cipher, uses a round function composed of four different byte-oriented transformations: byte substitution using a substitution table, shifting rows of the state array by different offsets, mixing the data within each column of the state array, and adding a round key to the state, as described in FIPS Publication 197 (Nov. 26, 2001), incorporated herein in its entirety by reference hereto. For example, the AES cipher is described in the following pseudo code.

Cipher(byte in[4*Nb], byte out[4*Nb], word w[Nb*(Nr+1)])
begin
   byte state[4,Nb]
   state=in
   AddRoundKey(state, w[0, Nb−1])
   for round=1 step 1 to Nr−1
     SubBytes(state)
     ShiftRows(state)
     MixColumns(state)
     AddRoundKey(state, w[round*Nb, (round+1)*Nb−1])
   end for
   SubBytes(state)
   ShiftRows(state)
   AddRoundKey(state, w[Nr*Nb, (Nr+1)*Nb−1])
   out=state
end The SubBytes( ) transformation provides a non-linear byte substitute which operates independently on each byte of the State. The SubBytes( ) transformation uses a substitution table, i.e., S-box. The substitution table is invertible and formed by: (i) taking the multiplicative inverse in the finite field $GF(2^8)$, the element $\{0,0\}$ being mapped to itself; and (ii) applying the following transformation over $GF(2)$:

$$b'_i = b_i \oplus b_{(i+4) \bmod 8} \oplus b_{(i+5) \bmod 8} \oplus b_{(i+6) \bmod 8} \oplus b_{(i+7) \bmod 8} \oplus c_i$$

where $0 \leq i < 8$, $b_i$ is the $i^{th}$ bit of the byte, $c_i$ is the $i^{th}$ bit of a byte c with the value $\{63\}$ or $\{01100011\}$. In matrix form, the transformation element of the substitution box is shown as the following by FIPS Publication 197:

$$\begin{bmatrix} b'_0 \\ b'_1 \\ b'_2 \\ b'_3 \\ b'_4 \\ b'_5 \\ b'_6 \\ b'_7 \end{bmatrix} = \begin{bmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{bmatrix} \begin{bmatrix} b_0 \\ b_1 \\ b_2 \\ b_3 \\ b_4 \\ b_5 \\ b_6 \\ b_7 \end{bmatrix} + \begin{bmatrix} 1 \\ 1 \\ 0 \\ 0 \\ 0 \\ 1 \\ 1 \\ 0 \end{bmatrix}.$$

Figure 9:
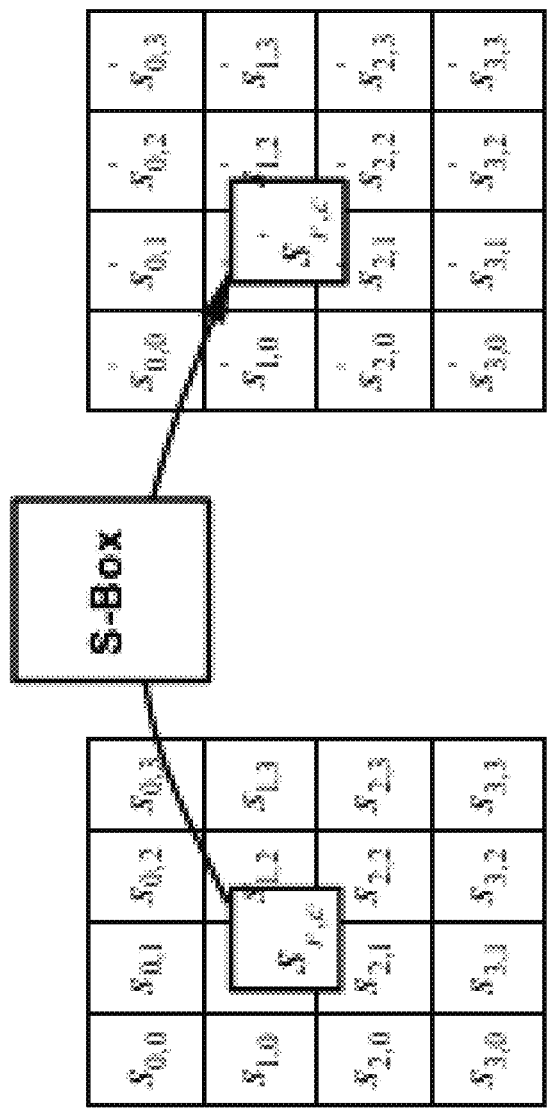
FIG. 9 shows effect of the SubBytes( ) transformation on the State according to an embodiment of the present invention.

The effect of the SubBytes( ) transformation on the State is shown in FIG. 9, from the FIPS Publication 197. The substitution box (S-Box) used in the SubBytes( ) transformation is shown in hexadecimal format by FIPS Publication 197 in FIG. 10.

The ShiftRows( ) transformation has bytes in the last three rows of the State which are cyclically shifted over different numbers of bytes, i.e., offsets. Here, the first row is not shifted. The ShiftRows( ) transformation involves:

$$s'_{r,c} = s_{r,(c+shift(r,Nb)) \bmod Nb} \text{ for } 0 < r < 4 \text{ and } 0 \leq c < Nb,$$

where shift(r,Nb) depends on the row r (here, Nb=4):

shift(1,4)=1; shift(2,4)=2; shift(3,4)=3.

Figure 11:
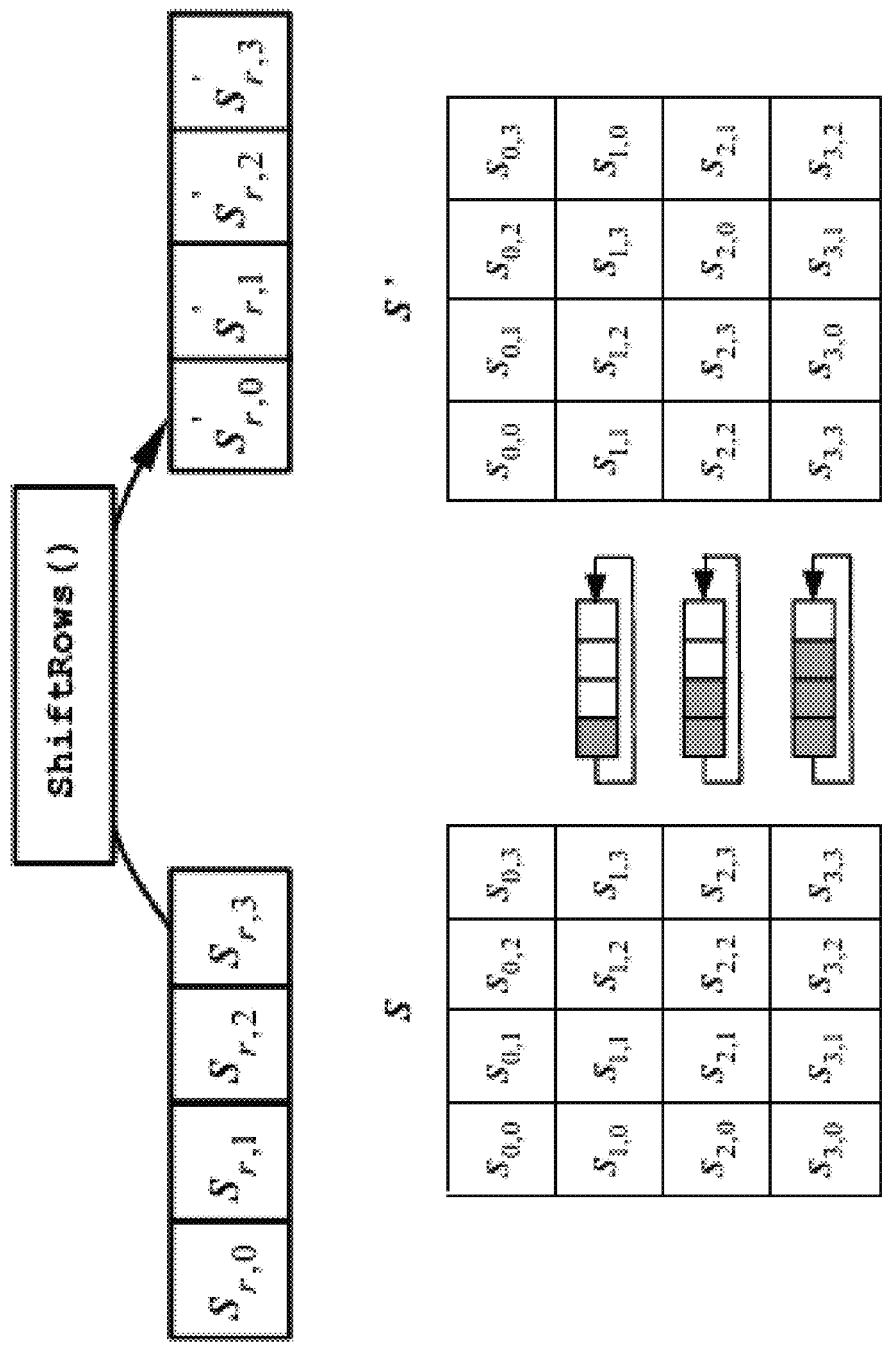
FIG. 11 shows an example ShiftRows( ) transformation according to an embodiment of the present invention.

This allows the moving of bytes to lower values of c in a given row, and the lowest bytes effectively wrap around and up into the top row. See, e.g., FIG. 11, from FIPS Publication 197.

Figure 12:
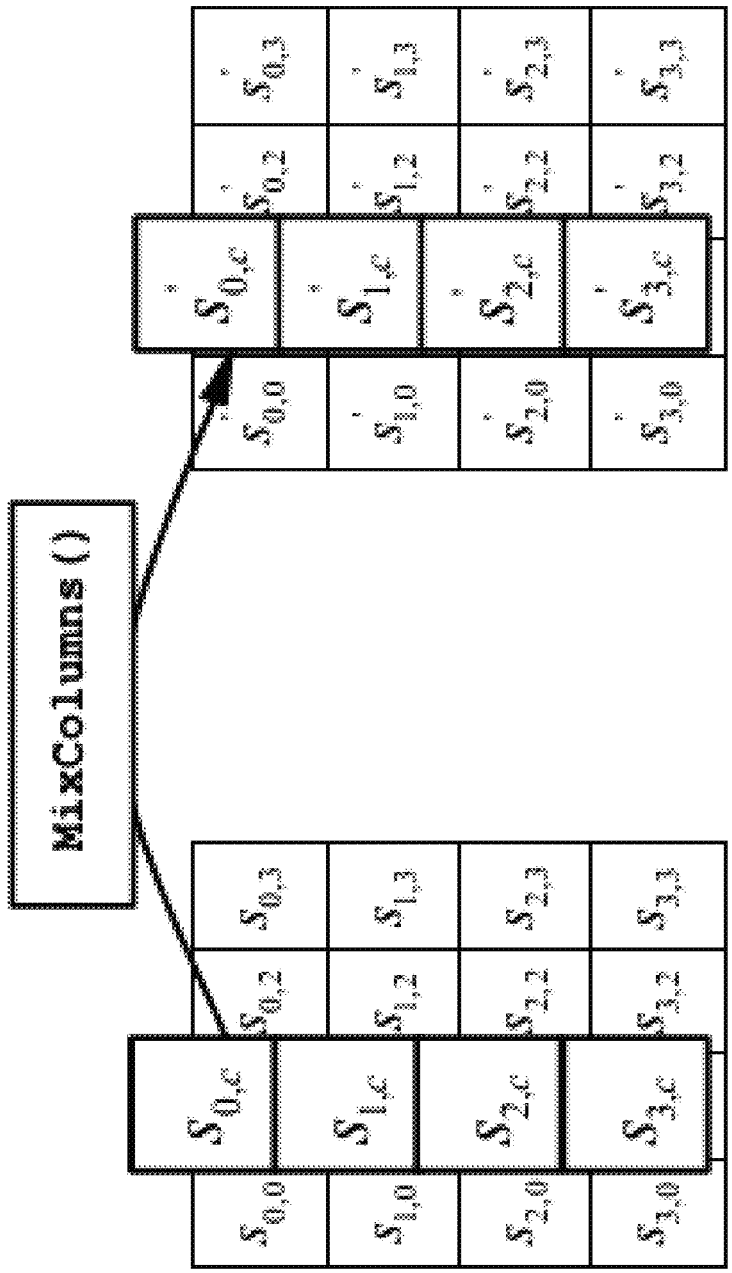
FIG. 12 shows an example MixColumns( ) transformation according to an embodiment of the present invention.

The MixColumns( ) transformation works on the state columns, treating each column as a four-term polynomial over $GF(2^8)$ and multiplied modulo $x^4+1$, with fixed polynomial a(x):

$$a(x) = \{03\}x^3 + \{01\}x^2 + \{01\}x + \{02\}$$

and is shown in FIG. 12, from FIPS Publication 197.

Figure 13:
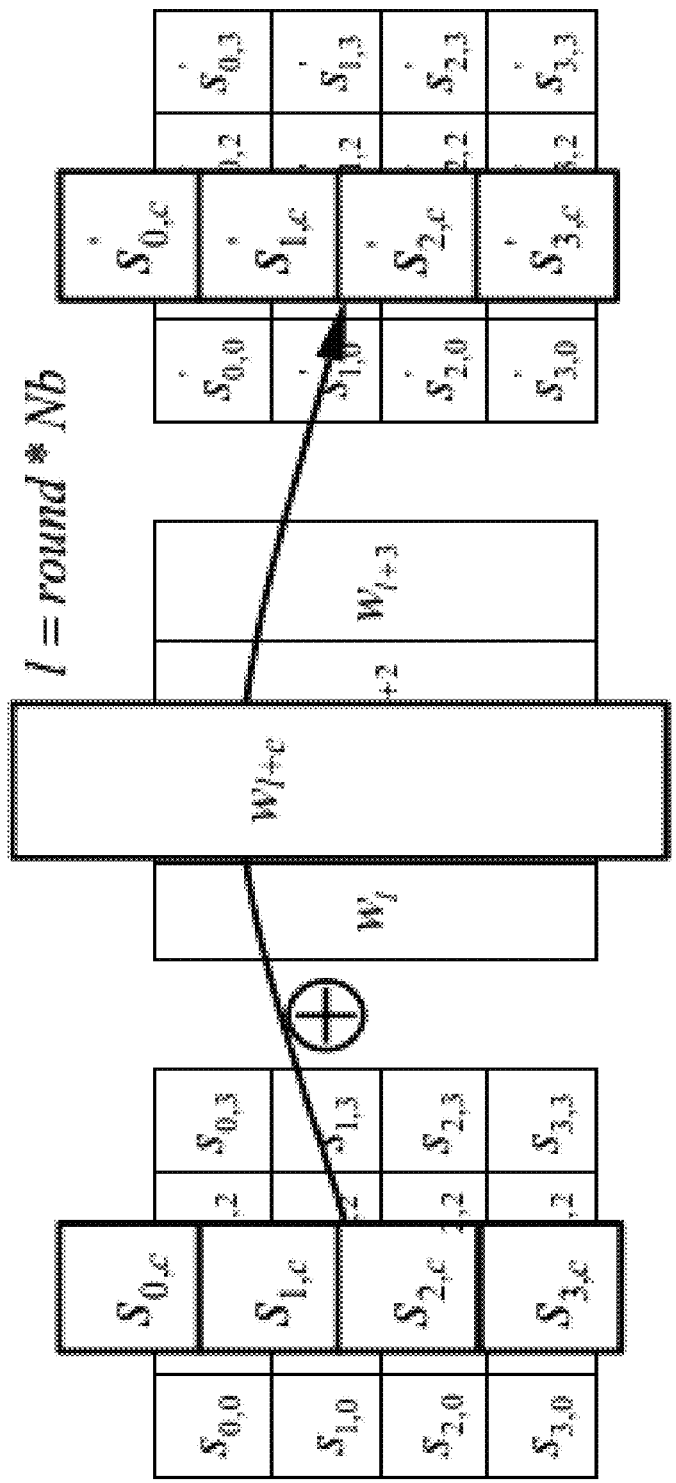
FIG. 13 shows an example AddRoundKey( ) transformation according to an embodiment of the present invention.

The AddRoundKey( ) transformation involves adding a Round Key to the State by a simple bitwise XOR operation. Each Round Key has Nb words from the key schedule, the Nb words added into the columns of the State, represented as:

$$[s'_{0,c}, s'_{1,c}, s'_{2,c}, s'_{3,c}] = [s_{0,c}, s_{1,c}, s_{2,c}, s_{3,c}] \oplus [w_{round \cdot Nb+c}]$$
for $0 \leq c < Nb$, where $[w_i]$ are the key schedule words, and $0 \leq round \leq Nr$.
In the AES cipher, the initial Round Key addition is effected when round=0, before the first application of the round function. AddRoundKey( ) transformation is applied to Nr rounds of the AES cipher when $1 \leq round \leq Nr$, as shown in FIG. 13, from FIPS Publication 197.

Regarding the key expansion, the AES algorithm performed a key expansion routine on the cipher key K to generate a key schedule. The key expansion routine generates Nb(Nr+1) words, the AES algorithm requiring an initial set of Nb words, and each of Nr rounds requiring Nb words of key data. The generated key schedule is a linear array of 4 byte words $[w_i]$, $0 \leq I < Nb(Nr+1)$. See, for example, the expansion of the input key into the key schedule represented by the pseudo code from FIPS Publication 197:

```
KeyExpansion(byte key[4*Nk], word w[Nb*(Nr+1)], Nk)
begin
  word temp
  i = 0
  while (i < Nk)
    w[i] = word(key[4*i], key[4*i+1], key[4*i+2], key[4*i+3])
    i = i+1
  end while
  i = Nk
  while (i < Nb * (Nr+1)]
    temp = w[i−1]
    if (i mod Nk = 0)
      temp = SubWord(RotWord(temp)) xor Rcon[i/Nk]
    else if (Nk > 6 and i mod Nk = 4)
      temp = SubWord(temp)
    end if
    w[i] = w[i−Nk] xor temp
    i=i + 1
  end while
end
```

The SubWord( ) function takes a four-byte input word and applies the substitution box (S-Box) to each of the bytes to produce an output word. The RotWord( ) function performs a cyclic permutation on a four-byte word and then returns the word. The Rcon[i] is a round constant word array. For a key expansion routine for a 256-bit cipher key (Nk=8), if Nk is 8 and I −4 is a multiple of Nk, then the SubWord( ) function is applied to w[i−1] before the XOR function.

In an embodiment, the cipher transformations can be inverted and then implemented in reverse order to produce a straightforward inverse cipher for the AES algorithm.

Figure 6:
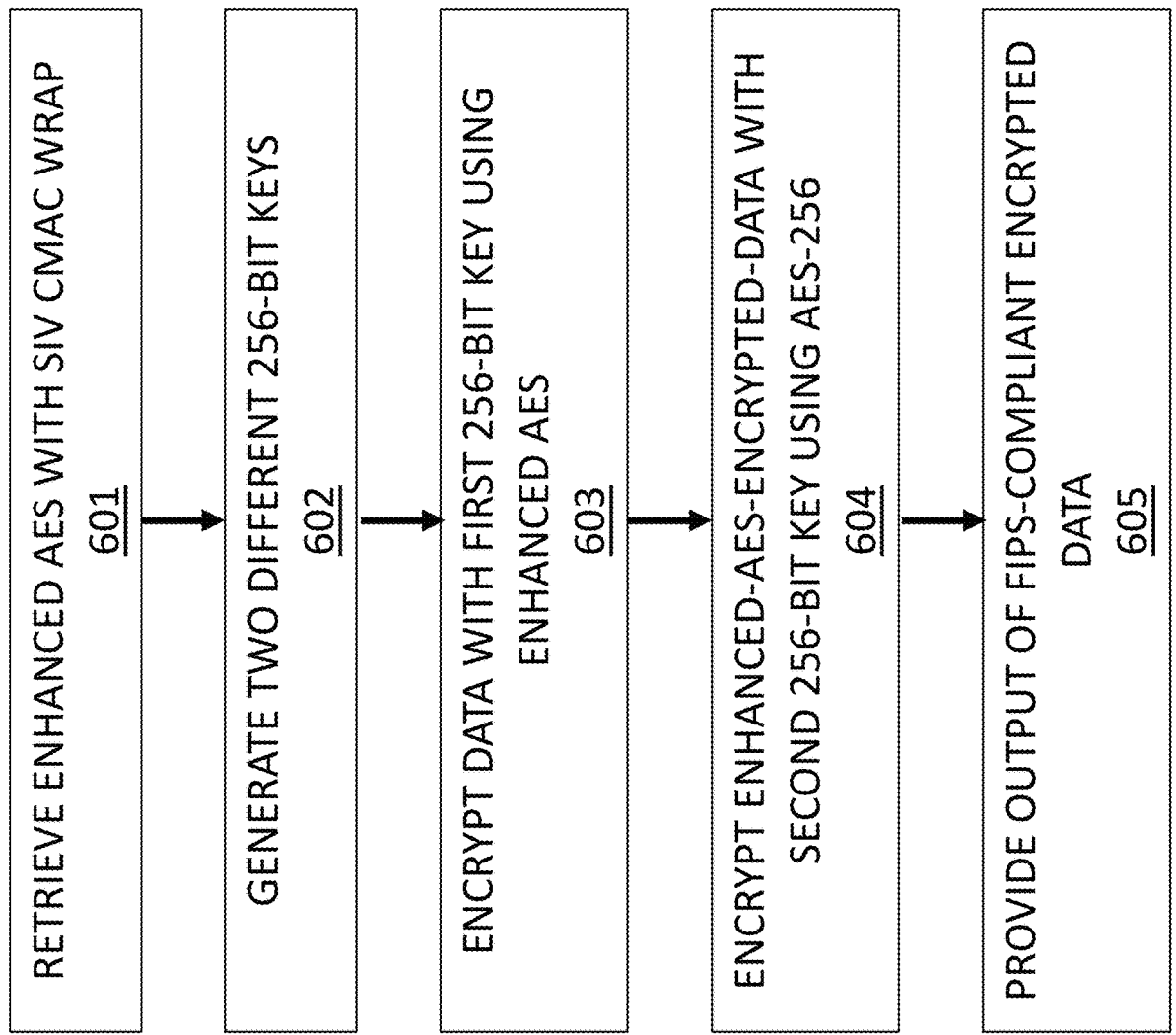
FIG. 6 shows an example method using enhanced-AES and AES-256 according to an embodiment of the present invention.

FIG. 6 shows an example method using enhanced-AES and AES-256 according to an embodiment of the present invention. Embodiments of the present invention have AES with an SIV (Synthetic Initialization Vector) CMAC (Cipher-based Message Authentication Code) wrap-512 601 to get two different keys, each of 256 bits 602. The first key is used to encrypt the input data using an enhanced 256-bit symmetric cipher, that provides some security advantage over AES-256, at the same key size 603. Then the result is encrypted again using the second key, this time with AES-256 604. This has the advantage of making the output FIPS-compliant—it is AES-256 encrypted data 605—while retaining the security advantage of the enhanced cipher used for the first encryption pass: namely, to recover the original data, one would have to break both AES-256 and the enhanced 256-bit symmetric cipher (for example, "eAES", or a stream cipher), provided that the intermediate encrypted data cannot be recovered. Hardware implementations have to be designed in such a way that it is too time-consuming even for a determined attacker to recover that intermediate data. Should the aforementioned still be recovered, the construction remains as safe as the enhanced 256-bit symmetric cipher, meaning that it still retains its enhancements with respect to AES-256.

In embodiments, enhanced-AES includes a two-step solution: (i) replacement of a differentially-weak internal key expansion function, i.e., key schedule, with a cryptographically-strong pseudo random generator; and, (ii) increasing the number of transformation rounds to at least 2n, or at least twice the best-known crypto-analytic attack against AES ciphers, as described in "Towards Post-Quantum Symmetric Cryptography," by John Gregory Underhill, Stiepan Aurelien Kovac, and Xenia Bogomolec, incorporated herein in its entirety by reference thereto. The key schedule is a key expansion function that expands a small input cipher key into a much larger internal array of round-keys, used by the ciphers transformation function to create a cipher-text output unique to that key. For example, the key schedule is replaced with a cryptographically strong generator which allows for the safe addition of more transformation rounds by securely generating a longer subkey array. Here, using an existing strong generator eliminates the need to modify the existing key expansion function. In enhanced-AES, the HKDF (SHA2) Expand key derivation function and the Keccak based cSHAKE XOF function are used, and are also well-regarded as being cryptographically-strong pseudo-random generators. In an embodiment, the HKDF variant uses one of the SHA2-256 or SHA2-512 versions of the hash function as the primary pseudo-random function. In an embodiment, the enhanced-AES involves an increased number of transformation rounds, i.e., the number of mixing cycles applied to the state. For example, the enhanced-AES 256-bit variant involves 22 rounds. This amount of rounds is twice the amount of a known number of rounds broken by an attacker. This amount is 8 rounds more than the current 14 rounds used by the NIST AES-256 system. In an embodiment, the enhanced-AES 512-bit variant involves 30 rounds. While some in industry see 512-bit lengths as unnecessary key length, it is foreseen in the future that increased security will be needed as attacker systems improve. In an embodiment, the enhanced-AES 1024-bit variant involves 38 rounds. In an embodiment, for the increased security, the adverse effect on performance of the key schedule when using the cryptographically-stronger generator is negligible, and does not significantly impact the transformation of medium to large data sets. In an embodiment, for the increase in rounds, there is a small effect on the speed of the cipher. The trade-off of a small adverse effect on speed with the increased security of the cipher is in favor of the increased and more robust security.

In an embodiment, an example AES rounds function, where the number of rounds processed in the main loop is determined by the value of Nr is:
Transform(byte in[4*Nb], byte out[4*Nb], word w[Nb*(Nr+1)])begin
   byte state[4,Nb]
   state=in
   AddRoundKey(state, w[0, Nb−1])
for round=1 step 1 to Nr−1
   SubBytes(state)
   ShiftRows(state)
   MixColumns(state)
   AddRoundKey(state, w[round*Nb, (round+1)*Nb−1])
end for
SubBytes(state)
ShiftRows(state)
AddRoundKey(state, w[Nr*Nb, (Nr+1)*Nb−1])
out=state
end Further, in an embodiment, a secure key expansion function, with octet key size ks being calculated as the ciphers block size in the 32-bit words Nb, times the number of rounds Nr+1, times the number of octets in each 23-bit word, is:
SecureExpansion(byte key[4*Nk], word w[Nb*(Nr+1)], word Nr)begin
   word ks=Nb*(Nr+1)*4
   byte tmp[ks]
   tmp=HKDF-Expand(key, dc, ks)
   while (i<ks)
     w[i/4]=word(tmp[i], tmp[i+1], tmp[i+2], tmp[i+3])
     i=i+4
   end while
end In the above, the temporary array of bytes tmp is generated by the HKDF Expand function using the input cipher key and the distribution code dc arrays as input. In an alternative embodiment, the temporary array of bytes tmp is generated by cSHAKE using the input cipher key and the distribution code dc arrays as input. In an embodiment, the array of octet sized integers is converted to 32-bit words and added to the rounds subkey array w.

In an embodiment, the cipher transformations can be inverted and then implemented in reverse order to produce a straightforward inverse cipher for the enhanced-AES algorithm.

Figure 7:
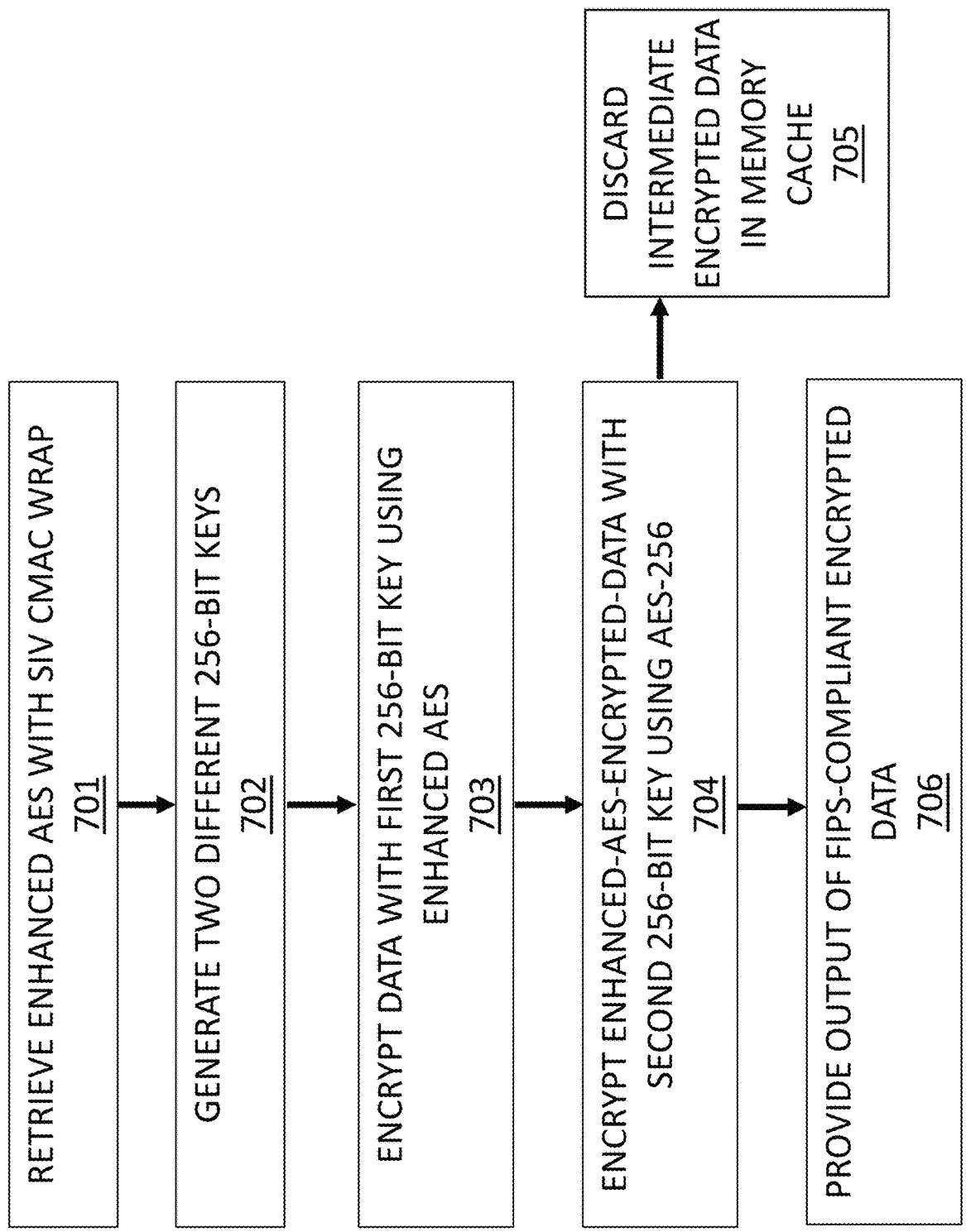
FIG. 7 shows an example method using enhanced-AES and AES-256 according to an embodiment of the present invention.

FIG. 7 shows an example method using enhanced-AES and AES-256 according to an embodiment of the present invention. In an embodiment, enhanced-AES ("eAes") is described in IACR e-print 2019/553, eprint.iacr.org/2019-553, incorporated herein in its entirety by reference thereto. In FIG. 7, the processor retrieves an enhanced AES cryptographic algorithm 701. The embodiment has a SIV CMAC wrap-512 which contains two different keys, each of 256 bits 702. The first key is used to encrypt the input data using an enhanced 256-bit symmetric cipher, that provides some security advantage over AES-256, at the same key size 703. The output or intermediate output is then encrypted again, this time using the second key, with AES-256 704. This has the advantage of making the output FIPS-compliant—since AES-256 encrypted data 706 is generated—while retaining the security advantage of the enhanced cipher used for the first encryption pass. In FIG. 7, a discarding of the intermediate output is destroyed or otherwise disposed of to prevent an "assisted attack." That is, without access to the intermediate output, in order to recover the original data, an attacker must break both the AES-256 and the enhanced 256-bit symmetric cipher. In FIG. 7, in an embodiment, the processing system disposes of the intermediate output in a manner that it cannot be recovered or is stored in a manner which makes it far too obstructive to reconstruct or recover 705.

Embodiments of the present invention provide for a system and method for a more secure processor-based system, or ASIC-based system. A user, for example, can be provided with a secure-encrypted link, patch, download or attachment, or dvd/flash drive/storage medium, having a cipher system embodiment of the present invention. The user can then integrate the cipher system embodiment into the intended system. For example, a system includes an ARM® brand processor, integrated directly with ARM®. For example, a system includes a system hardware accelerator using an ARM®-brand processing board associated with a server for a system. Other systems/processors can be used. These and other embodiment examples provided herein are for exemplary purposes only and not intended to limit the scope of the invention.

Embodiments of the present invention include a user-interface system which allows for the enhanced AES two-key cipher system to be turned on or off on a system, processor, cloud device, smartphone, et al. A variety of hardware can be used to run the enhanced AES two-key cipher system embodiments of the present invention. For example, a user can login to the user's administration console, click on settings, and then subsequent links to the appropriate user interface screen which allows a user to toggle or select the enhanced AES system. Alternatively, the user can deselect the enhanced AES system to disable its use in the system. The user can then click on the «ok» or other confirmation button/indicator, if any, and restart the application server. Similarly, the user may wish to use the enhanced cipher only, to gain efficiency, at the cost of (for the time being) FIPS compliance. This is especially useful once the enhanced ciphers will eventually become FIPS-certified themselves.

In embodiments of the present invention, a specific subclass of enhanced symmetric ciphers which can be used are tweakable block ciphers, as described in "Tweakable Block Ciphers," by M. Liskov, R. L. Rivest, et al., CRYPTO 2002, LNCS 2442, Springer-Verlag, Berlin Heidelberg, Germany (2002), pp. 31-46, and incorporated herein in its entirety by reference thereto. Tweakable block ciphers involve the usual inputs of a message and cryptographic key, as well as a "tweak" input. This tweak essentially serves a similar purpose as an initialization vector does for a CBC modeor, for example. A tweakable block cipher has the signature:

$$\tilde{E}:\{0,1\}^k \times \{0,1\}^t \times \{0,1\}^n \rightarrow \{0,1\}^n$$

where the three inputs for a tweakable block cipher are: a key $K \in \{0,1\}k$, a tweak $T \in \{0,1\}t$, and a message (or plain text) $M \in \{0,1\}n$ and the output generated is a ciphertext $C \in \{0,1\}n$. Thus, in an embodiment of the present invention, a tweakable block cipher can be used as a first encryption method, and then the generated cipertext can be inputted into AES-256 in order to produce a more secure and FIPS-compliant output.

In embodiments of the present invention, a customization string in cSHAKE, defined in "SHA-3 Derived Functions: cSHAKE, KMAC, TupleHash and ParallelHash" by J. Kelsey et al., National Institute of Standards and Technology (NIST) Special Publication 800-185, U.S. Department of Commerce (December 2016), incorporated herein in its entirety by reference thereto, can be used in combination with a FIPS-compliant encryption such as AES, in the example embodiments described in this application. For example, the cSHAKE function includes an input string (S) to allow customization of use of the function. For example, computation of a key fingerprint or hash value for a public key can be via:

cSHAKE128(public_key, 256, " ", "key fingerprint")

where "key fingerprint" is a user's customization of string S, referred to above. The elegance of cSHAKE is that the cSHAKE computation can be customized for a different use, e.g., signing an email:

cSHAKE128(email_contents, 256, " ", "email signature"), where "email fingerprint" is the user's customization of string S. This customization provides a way for a user to avoid confusion or a collision between two cSHAKE values being used. Further, this method makes it more difficult for an attacker since different values of S are used.

Figure 14:
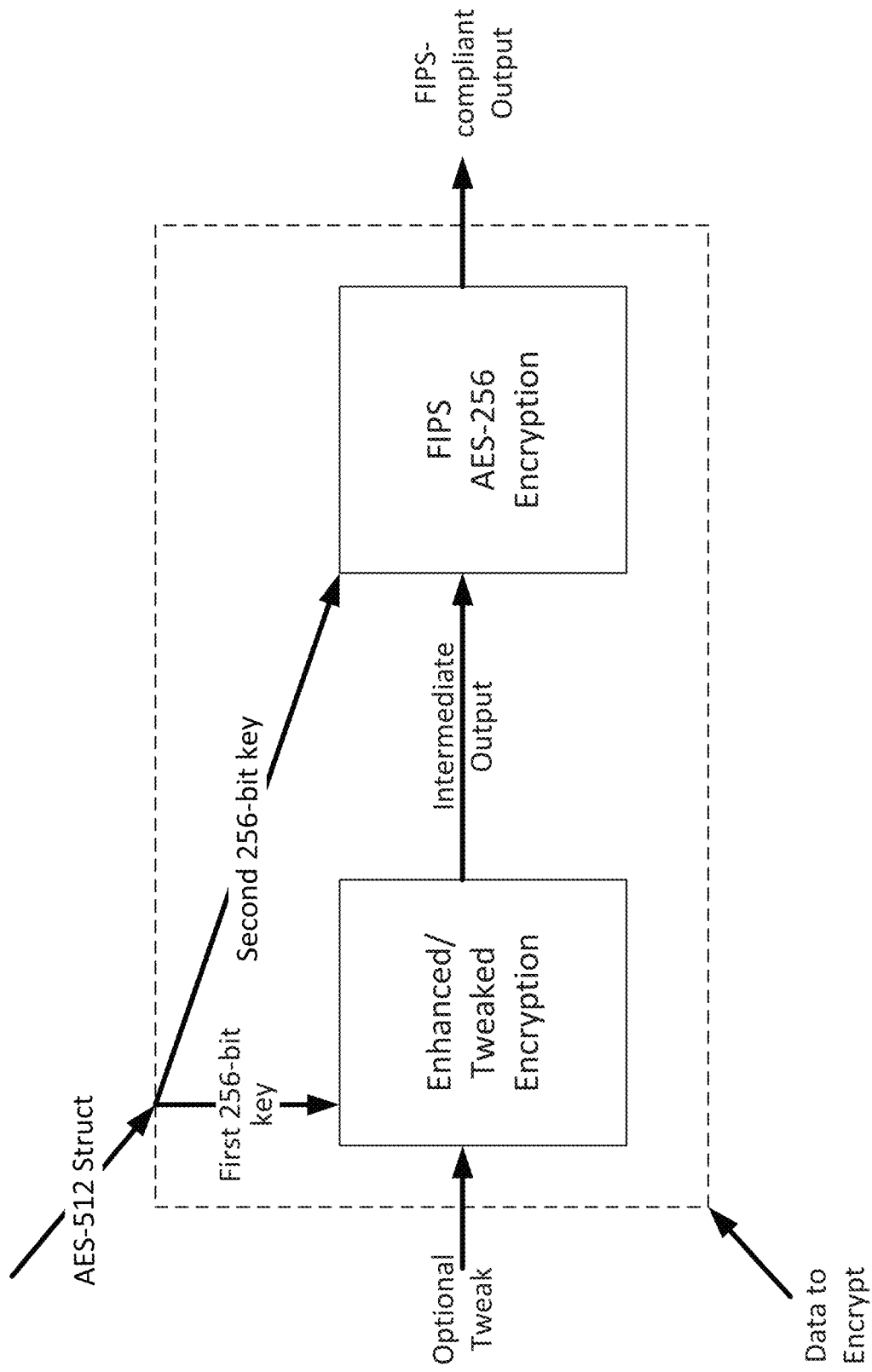
FIG. 14 shows an example flow diagram of an embodiment of the present invention.

FIG. 14 shows an example flow diagram of an embodiment of the present invention. For example, a tweakable block cipher can be used, and the tweak or third input, as described above and known in the industry, is involved in the enhanced encryption. In this example, 256-bit keys are used, the first key in the enhanced or tweaks encryption, and the second in the FIPS AES-256-bit encryption. The intermediate output from the first enhanced or tweaked encryption is then fed as an input to the FIPS compliant AES-256 encryption in order to produce a FIPS-compliant encrypted output. The cSHAKE cipher, among others described herein and others known in the industry having similar properties, can be specifically used in an embodiment of FIG. 14 in order to prevent a collision between values in a hybrid system such as this and other embodiments described herein.

Until such time that tweaked and/or enhanced ciphers such as enhanced-AES or the others described herein or others which are applicable for use embodiments of this invention alone are deemed FIPS-compliant, the various embodiments described herein provide an elegant, usable method and system for more robust and secure encryption which is ultimately FIPS-compliant. That being said, the embodiments of the present invention provide for a double-nonsimilar-encryption solution which is difficult for an attacker to break.

The various embodiments of the present invention described herein is a software application which is usable on a mobile device, from a computer terminal, or from a barebones or basic technical device which connects to the network for all information and data. Embodiments of the present invention provide for computer-readable medium comprising computer-readable instructions which when implemented on a processing or computer device effects one or more actions. Embodiments of the present invention provide for one or more databases to hold the various information on the users, controllers, circuits, and various electronic devices employed, and data/information received from a variety of sources, servers, networks, manual inputs, et al. and the software system. The information can be stored in a single database or a distributed database structure, or in a variety of types of structured and unstructured locations. The information can be stored in a central server or on a variety of different servers or machines or processors. The information can be accessed by a mobile device using telecommunications, WiFi, Internet, Intranet, or other communications protocol(s).

Features of the various embodiments of above-identified system and method described herein can be combined with and without each other. While the above-described embodiments of the present disclosure are described in detail regarding specific displays, views, methods, and systems, the invention is not limited to thereto. Various equivalent variations or substitutions can be made by one or ordinary skill in the art without departing from the scope of the present disclosure, and are all included within the scope the disclosure of the present invention.

What is claimed is:

1. A computer software method comprising:
   retrieving via a computer, a first type of encryption algorithm, wherein the first type of encryption algorithm is an enhanced-AES algorithm that utilizes a cryptographically-strong pseudo random generator in place of a key generator;
   executing, via the computer, the first type of encryption algorithm on an identified data;
   generating, via the computer, a first encrypted data output from the execution of the first type of encryption algorithm;
   retrieving, via the computer, a second type of encryption algorithm, wherein the second type of encryption algorithm is an AES algorithm;
   executing the second type of encryption algorithm on the first encrypted data output; and
   generating an enhanced encrypted data output from the execution of the second type of encryption algorithm.

2. The computer software method of claim 1, further comprising:
   storing the first encrypted data output in a secure memory location.

3. The computer software method of claim 1, wherein the enhanced encrypted data output is FIPS compliant.

4. A computer system comprising:
   at least one hardware module;
   a system memory;

a system memory controller to control communication between the at least one software module and the system memory wherein the system memory stored computer-executable instructions for a secure transmission method, including:

retrieving, via a computer, a first type of encryption algorithm, wherein the first type of encryption algorithm is an enhanced-AES algorithm that utilizes a cryptographically-strong pseudo random generator in place of a key generator;

executing, via the computer, the first type of encryption algorithm on an identified data;

generating, via the computer, a first encrypted data output based on the execution of the first type of encryption algorithm;

retrieving, via the computer, a second type of encryption algorithm;

executing the second type of encryption algorithm on the first encrypted data output; and generating an enhanced encrypted data output based on the execution of the second type of encryption algorithm.

5. The system of claim 4, wherein the secure transmission method further includes storing the first encrypted data output in a secure memory location.

6. The system of claim 4, wherein the first type of encryption algorithm involved at least one of: enhanced-AES; Tuak; and tweakable block cipher; PKI; and QKD.

7. The system of claim 4, wherein the second type of encryption algorithm is AES algorithm.

8. The system of claim 4, wherein the enhanced-AES algorithm has at least 22 transformation rounds.

9. The system of claim 4, wherein the system memory controller effects the execution of the secure transmission method for the at least one hardware module.

10. A non-transitory computer-readable medium having instructions thereon for performing a method comprising:

retrieving, by a processor, a first type of encryption algorithm, wherein the first type of encryption algorithm is an enhanced-AES algorithm that utilizes a cryptographically-strong pseudo random generator in place of a key generator;

executing, by a processor, the first type of encryption algorithm on an identified data;

generating, by a processor, a first encrypted data output;

retrieving, by the processor, a second type of encryption algorithm;

executing, by the processor, the second type of encryption algorithm on the first encrypted data output; and generating, by the processor, an enhanced encrypted data output.

11. The method of claim 10, further comprising:

storing the first encrypted data output in a secure memory location.

12. The method of claim 10, wherein the enhanced encrypted data output is Federal Information Processing Standards (FIPS) compliant.

13. The method of claim 10, wherein the second type of encryption algorithm is AES algorithm.

14. The method of claim 10, wherein the enhanced-AES algorithm has at least 22 transformation rounds.

15. A computer software method comprising:

retrieving, via a computer, a first type of encryption algorithm, wherein the first type of encryption algorithm is an enhanced-AES algorithm that utilizes a cryptographically-strong pseudo random generator in place of a key generator;

executing, via the computer, the first type of encryption algorithm on an identified data;

generating, via the computer, a first encrypted data output from the execution of the first type of encryption algorithm;

storing the first encrypted data output in a secure memory location;

retrieving, via the computer, a second type of encryption algorithm, wherein the second type of encryption algorithm is an AES algorithm;

executing the second type of encryption algorithm on the first encrypted data output; and generating an enhanced encrypted data output based on the execution of the second type of encryption algorithm.

16. The method of claim 15, wherein the enhanced encrypted data output is Federal Information Processing Standards (FIPS) compliant.

17. The method of claim 15, wherein the enhanced-AES algorithm has at least 22 transformation rounds in its vendor-recommended default configuration undergoing standardization in ISO/IEC 18033-7.

18. The method of claim 15, wherein the enhanced encrypted data output is Federal Information Processing Standards (FIPS) compliant.

* * * * *